(12) United States Patent
Noulette

(10) Patent No.: US 12,360,304 B2
(45) Date of Patent: Jul. 15, 2025

(54) METHOD FOR PREPARING OPTICAL FIBERS WITH LATERAL LIGHT EMISSION AND INSTALLATION FOR IMPLEMENTING SAME

(71) Applicant: EFI LIGHTING, Miribel (FR)

(72) Inventor: Jacques Noulette, Frontonas (FR)

(73) Assignee: EFI LIGHTING, Miribel (FR)

( * ) Notice: Subject to any disclaimer, the term of this patent is extended or adjusted under 35 U.S.C. 154(b) by 0 days.

(21) Appl. No.: 18/554,678

(22) PCT Filed: Apr. 14, 2022

(86) PCT No.: PCT/FR2022/050705
§ 371 (c)(1),
(2) Date: Oct. 10, 2023

(87) PCT Pub. No.: WO2022/223911
PCT Pub. Date: Oct. 27, 2022

(65) Prior Publication Data
US 2024/0192422 A1    Jun. 13, 2024

(30) Foreign Application Priority Data
Apr. 19, 2021   (FR) .................................. 2104035

(51) Int. Cl.
*F21V 8/00*      (2006.01)
*B29D 11/00*    (2006.01)

(52) U.S. Cl.
CPC ........ *G02B 6/001* (2013.01); *B29D 11/00663* (2013.01)

(58) Field of Classification Search
CPC ...................................................... G02B 6/001
See application file for complete search history.

(56) References Cited

U.S. PATENT DOCUMENTS

| | | |
|---|---|---|
| 2002/0037133 A1 | 3/2002 | Unsworth |
| 2016/0291277 A1 | 10/2016 | Bauco et al. |
| 2017/0315318 A1 | 11/2017 | Modavis |
| 2018/0143367 A1 | 5/2018 | Barbe et al. |

FOREIGN PATENT DOCUMENTS

FR     2 714 147 B1    6/1995

OTHER PUBLICATIONS

International Search Report, dated Oct. 12, 2022, corresponding to International Application No. PCT/FR2022/050705.

*Primary Examiner* — Joseph L Williams
(74) *Attorney, Agent, or Firm* — Ladas & Parry LLP; Malcolm I. MacDonald

(57) ABSTRACT

The object of the invention relates to a method for preparing optical fibers (1) each composed of a core (2) surrounded by a sheath (3), in order to create optical fibers with lateral light emission, the method being such that:
    the translational travel of optical fibers (1) is ensured in front of a station for emitting a laser beam (F),
    the laser beam (F) directed towards the optical fibers in order to create point-like alterations (4) in the sheath of the optical fibers is moved along a direction (T) transverse to the direction of translation (A) of the optical fibers and along a second way of the transverse direction (T), opposite to the first way.

16 Claims, 4 Drawing Sheets

[Fig.1]
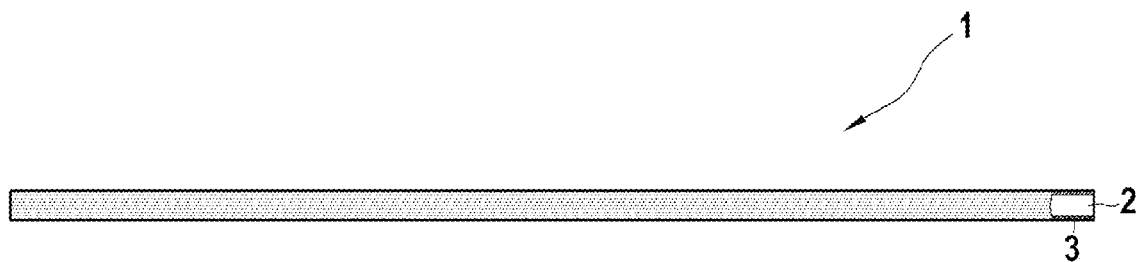
[Fig.2]
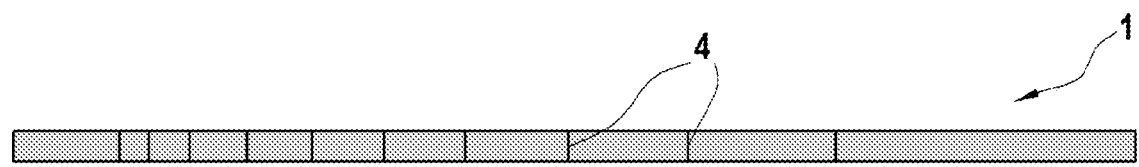
[Fig.3]
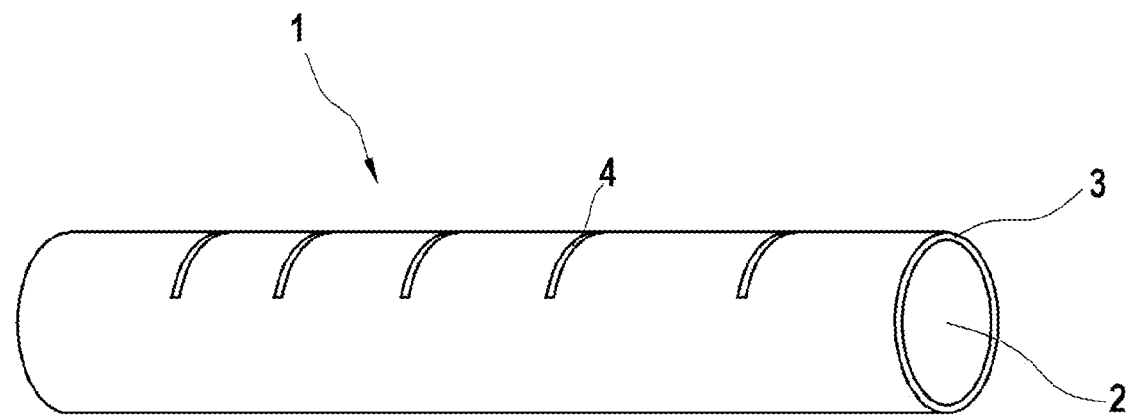

[Fig.4]
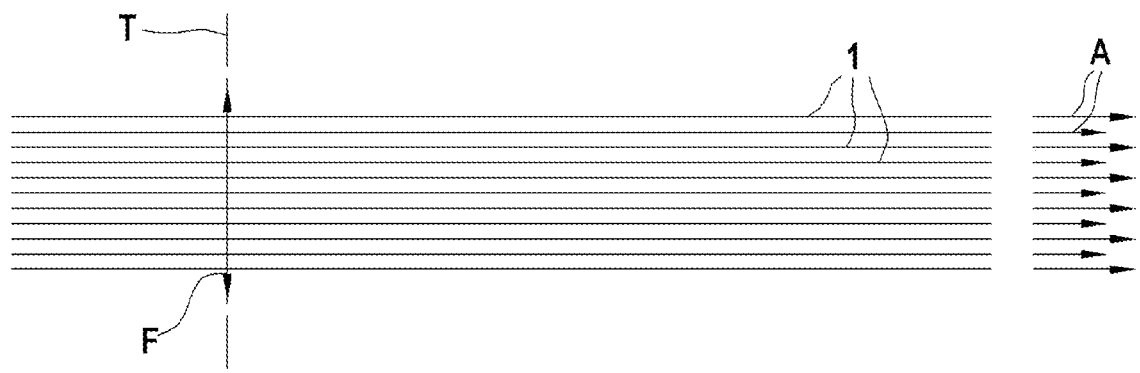
[Fig.5]
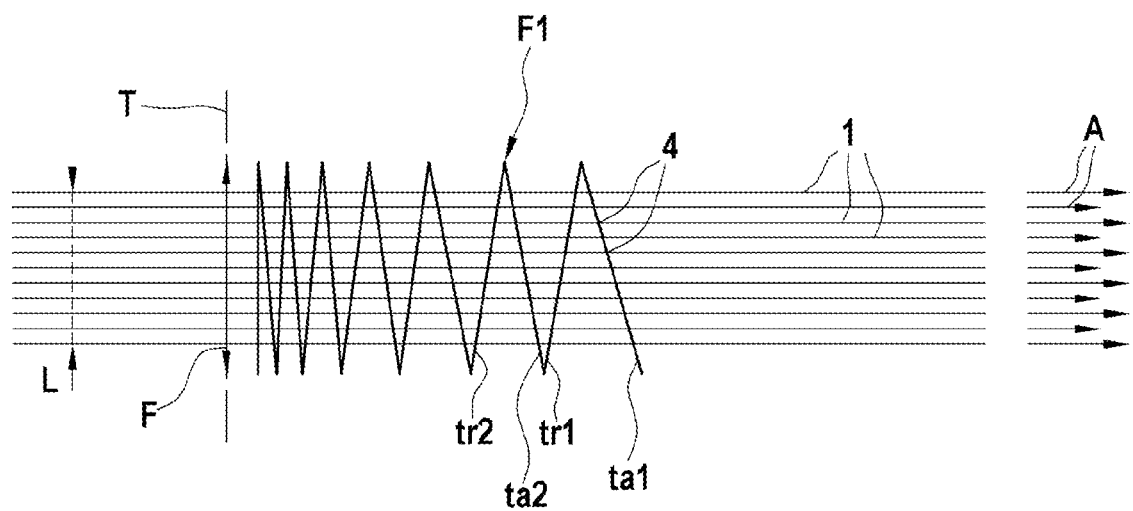

[Fig.6]
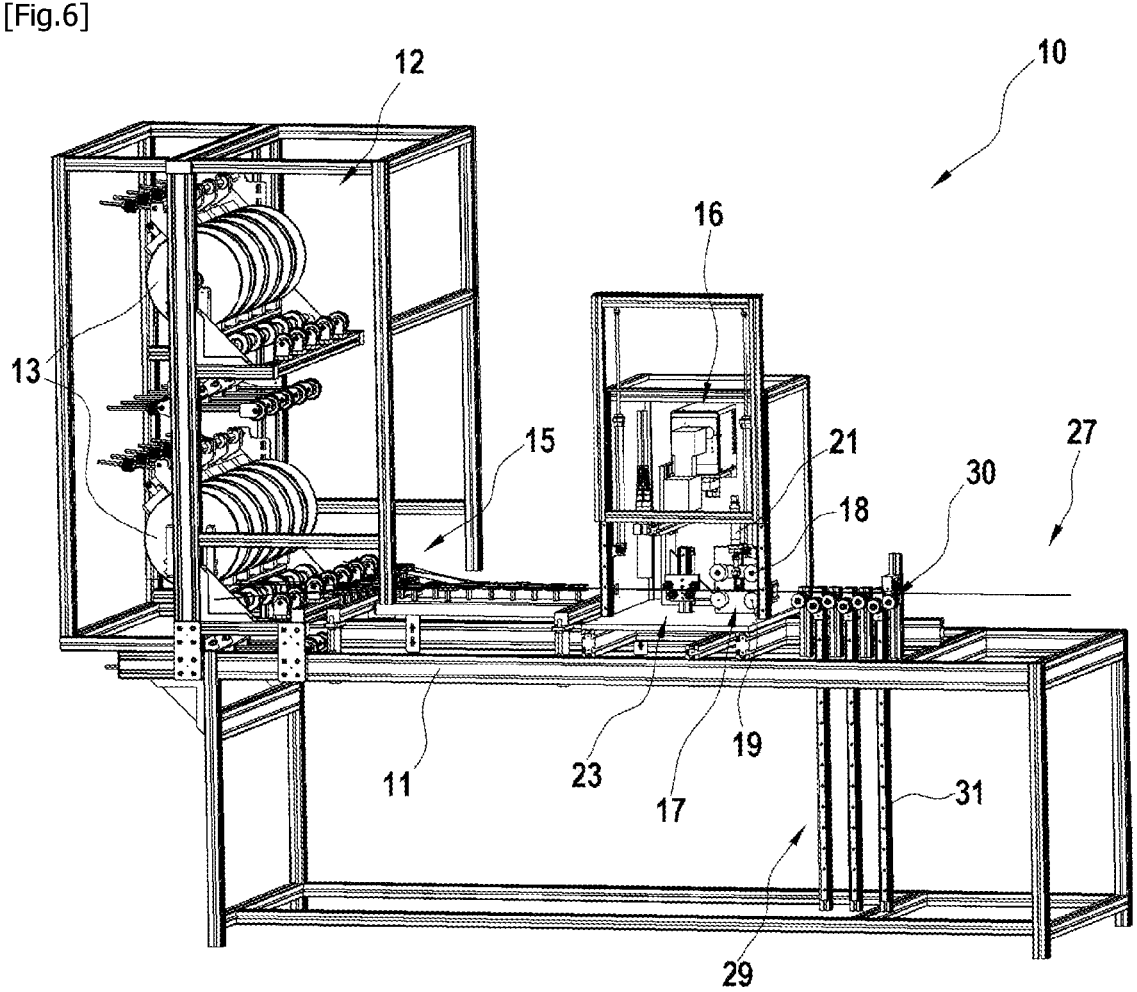

[Fig.7]
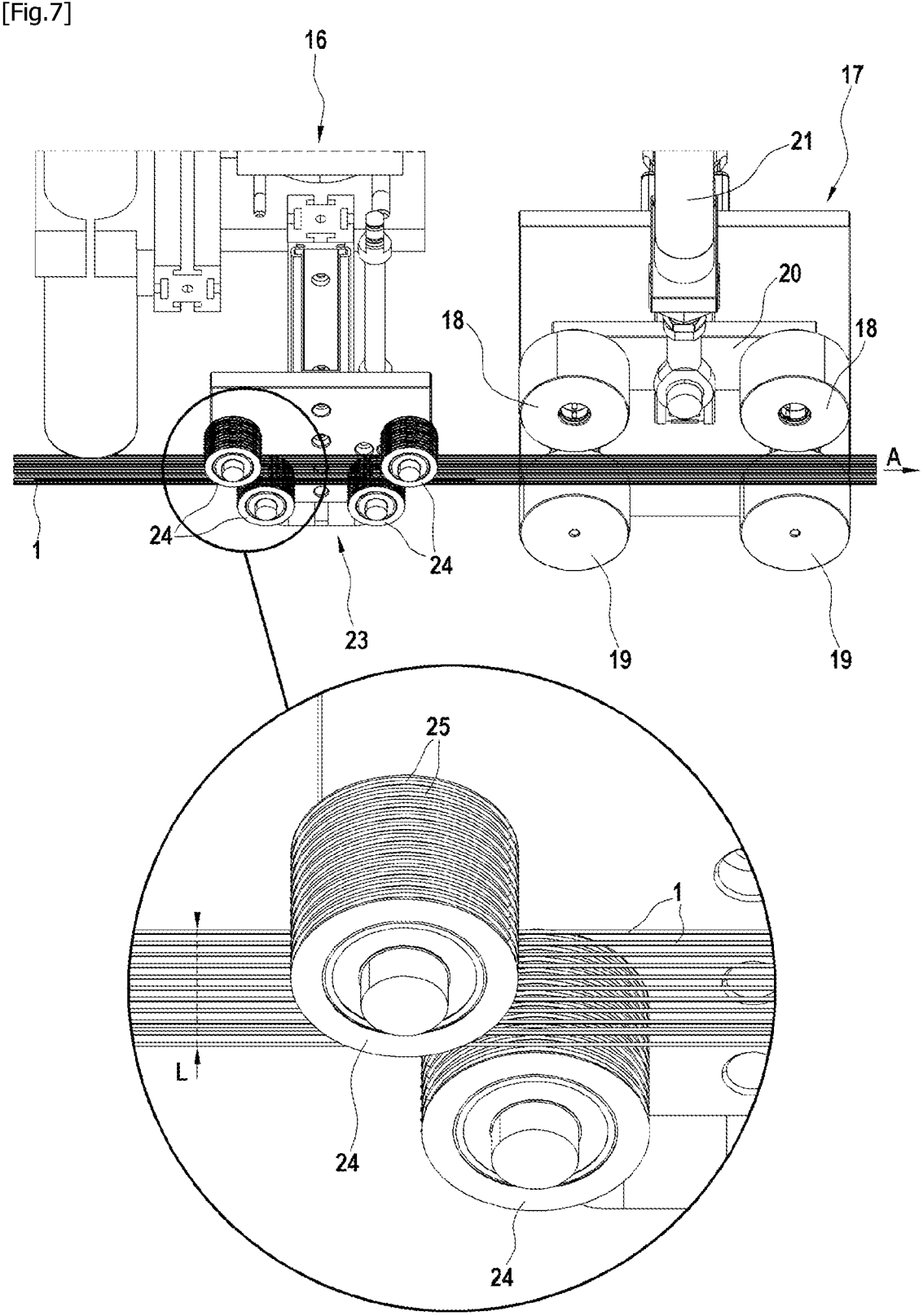

METHOD FOR PREPARING OPTICAL FIBERS WITH LATERAL LIGHT EMISSION AND INSTALLATION FOR IMPLEMENTING SAME

TECHNICAL FIELD

The present invention relates to the field of optical fibers with lateral light emergence as well as the methods for obtaining these optical fibers.

The object of the invention more particularly relates to a light system implementing optical fibers with lateral light emergence, finding applications in many technical fields such as for example building, aeronautics, medical field and advantageously automotive.

PRIOR ART

The prior art knows the optical fibers with lateral light emission including a core carrying light and surrounded by a sheath provided with surface alterations or modifications from which the luminous flux emerges. For example, patent FR 2 714 147 proposes making these fibers by making the optical fibers travel in a sandblasting cabinet projecting an abrasive under high pressure. To prevent the optical fibers from bending during the treatment under the effect of the exerted high pressure, the optical fibers are subjected to a tensioning mechanism likely to lead to risks of breaking of the optical fibers. Furthermore, this technique does not make it possible to easily control the dimensions and the location of the alterations made on the optical fibers. However, it appears necessary to control the dimensions and the location of the alterations along the optical fiber so as to obtain homogeneity of the light over the entire length of the optical fiber.

Patent EP3 303 667 proposes to make a fabric with weft and warp woven optical fibers and to surface treat this fabric by a mechanical, chemical or thermal treatment in order to form surface alterations allowing light propagating in the optical fiber to emerge through these surface alterations. Once treated, the optical fibers are removed from the fabric to be inserted into a translucent envelope to make a light system with lateral light emission. This weaving technique leads to an increase in the manufacturing costs and has a limitation as to the length of the obtained optical fibers. In addition, the weaving leads to the appearance of points of light with excessive luminance.

Patent application US 2017/315318 describes a method for preparing optical fibers with lateral light emission using a laser beam. This application provides for the displacement in translation of the optical fiber with a possibility of rotation about its longitudinal axis. This preparation method does not appear to be easy to implement.

Patent application US 2002/037133 describes a method for preparing optical fibers with lateral light emission using a laser apparatus movably mounted on a table that can be moved along two directions. The fiber can be driven in rotation. This preparation method is relatively complex to implement.

DISCLOSURE OF THE INVENTION

The present invention aims to overcome the drawbacks of the prior art by proposing a new method for preparing optical fibers with lateral light emission, of simple and inexpensive design, suitable for obtaining homogeneity of light over the entire length of the optical fibers and this for optical fibers of great length.

To achieve such an objective, the object of the invention is a method for preparing optical fibers each composed of a core surrounded by a sheath, in order to create optical fibers with lateral light emission. The method is such that it ensures the translational travel for at least one optical fiber in front of a station for emitting a laser beam, and that it moves alternately along a first way of a direction transverse to the direction of translation of the optical fibers and along a second way of the transverse direction, opposite to the first way, the laser beam directed towards the optical fibers in order to create point-like alterations in the sheath of the optical fibers.

According to a preferred example, the translational travel is ensured for a series of optical fibers disposed next to each other, in front of a station for emitting a laser beam.

Advantageously, the laser beam is moved along the transverse direction with a trajectory beginning downstream of the first optical fiber encountered and ending upstream of the last optical fiber encountered.

Preferably, a tensioning of the optical fibers is ensured during their translational travel in front of the laser beam emission station.

According to a characteristic of implementation, the translational travel of the optical fibers is ensured at a variable speed in order to create on each optical fiber point-like alterations, at least some of which have different spacing distances.

Advantageously, the translational travel of the optical fibers is ensured at a variable speed in order to obtain homogeneity of the light over the entire length of a light system with lateral light emission including one or more optical fibers.

For example, the laser beam has a constant power.

According to a variant of implementation, after the creation of the point-like alterations, the optical fibers are cut and inserted into a translucent envelope to form a light system with lateral light emission.

For example, before their cutting, the optical fibers are stored temporarily.

Another object of the invention is to propose an optical fiber with lateral light emission obtained by the method in accordance with the invention and including a sheath having point-like alterations of constant width arranged parallel to each other along a portion of the circumference.

Another object of the invention is to propose an installation for preparing optical fibers each composed of a core surrounded by a sheath, with a view to forming a light system with lateral light emission, this installation including:
 a distribution station including for each optical fiber, a reel of an optical fiber,
 a system ensuring the translation of the optical fibers to ensure their travel in front of a station for emitting a laser beam,
 a station for emitting a laser beam moved along a direction transverse to the direction of translation of the optical fibers in order to create point-like alterations in the sheath of the optical fibers.

Advantageously, the system ensuring the translation of the optical fibers has a variable speed.

Preferably, the installation includes a system for handling the optical fibers coming from the reels in order to position them parallel next to each other.

Preferably, the installation includes a station for cutting the optical fibers.

Typically, the installation includes a system for guiding the optical fibers making it possible to control the center distance between the optical fibers and/or a device for tensioning each of the optical fibers.

BRIEF DESCRIPTION OF THE DRAWINGS

FIG. 1 is a plan view of an optical fiber before its preparation according to the method in accordance with the invention.

FIG. 2 is a plan view of an optical fiber after application of the preparation method in accordance with the invention.

FIG. 3 is a perspective view of an optical fiber after application of the preparation method in accordance with the invention.

FIG. 4 is a plan view of a series of optical fibers driven in translation parallel to each other before carrying out the laser treatment operation in accordance with the invention.

FIG. 5 is a plan view showing the trace of the laser beam applied during the translation of a series of optical fibers.

FIG. 6 is a perspective view of one exemplary embodiment of an installation for the implementation of the optical fiber preparation method in accordance with the invention.

FIG. 7 is a perspective detail view of the installation illustrated in FIG. 6.

DESCRIPTION OF THE EMBODIMENTS

The object of the invention relates to a method for preparing optical fibers of all known types, with a view to obtaining optical fibers with lateral light emission. As shown in FIG. 1, it is recalled that an optical fiber 1 is a waveguide for the light including a core 2 made by a translucent medium and coated with a layer of another translucent medium of different refractive index and called sheath 3 in the following description. For example, the optical fiber 1 is based on polymethyl methacrylate (PMMA).

In the context of the invention, the sheath 3 of the optical fiber 1 has point-like alterations 4 corresponding to surface destructions or modifications exposing the core of the optical fiber. These alterations 4 are the seat of a light emergence when a luminous flux is present in the optical fiber 1. The optical fibers 1 are cut and inserted into a translucent envelope to form a light system with lateral light emission. Typically, a light system with lateral light emission includes from one to fifteen optical fibers 1 inserted into the translucent envelope.

FIGS. 2 and 3 illustrate by way of example optical fibers 1 with lateral light emission by the point-like alterations 4. These optical fibers 1 with lateral light emission are obtained according to the preparation or treatment method in accordance with the invention described below.

According to the method in accordance with the invention:
- the translational travel along a direction of translation A is ensured for at least one optical fiber 1 and preferably a series of optical fibers 1 disposed next to each other, in front of a station for emitting a laser beam F,
- the laser beam F directed towards the optical fibers in order to create the point-like alterations 4 in the sheath 3 of the optical fibers 1 is moved along a direction T transverse to the direction of translation of the optical fibers 1.

As shown more specifically in FIGS. 4 and 5, the method according to the invention consists in moving in translation the optical fibers 1 along a direction of translation A corresponding to the way of rectilinear elongation of the optical fibers. In other words, each optical fiber 1 is moved in translation by advantageously applying a tensile load on the optical fiber in the way of its length. In the examples illustrated in the drawings, the method aims to move together several optical fibers positioned parallel to each other. Of course, the method according to the invention can be implemented by moving in translation only an optical fiber 1 in front of the laser beam.

Upstream of the laser beam F, the optical fibers 1 are moved by being positioned parallel to each other according to a spacing pitch or center distance comprised between 1.5 mm and 2.5 mm and for example equal to 1.8 mm. The optical fibers 1 are located in a typically horizontal extension plane, together occupying a total width L taken perpendicular to the direction of displacement. This total width L is comprised between 7 mm and 30 mm for a number of optical fibers 1 respectively equal to 4 and 11. Of course, the number of optical fibers moved simultaneously can be arbitrary.

The laser beam F is moved along a direction of displacement T transverse to the direction of translation A of the optical fibers 1, by being directed towards the optical fibers in order to create the point-like alterations 4 in the sheath 3. It must be considered that the laser beam has a dimensioning adapted to make point-like alterations 4 in the sheath 3. Advantageously, the laser beam F has a constant power.

According to one preferred characteristic of implementation, the optical fibers 1 are tensioned during their translational travel in front of the laser beam F emission station. In other words, the optical fibers 1 are placed in a rectilinear position when the laser beam F makes the point-like alterations 4.

In the example illustrated in FIGS. 4 and 5, the direction of displacement T of the laser beam is perpendicular to the direction of translation A of the optical fibers 1. Of course, it can be envisaged that the direction of displacement T of the laser beam is not perpendicular to the direction of translation A of the optical fibers 1.

According to an advantageous characteristic of embodiment, the method consists in moving the laser beam F alternately along a first way of the direction of displacement T and along a second way of the direction of displacement T, opposite to the first way. In other words, the trajectory of the laser beam F is composed of a series of forward (tai) and return (tri) paths made along the transverse direction of displacement T, as illustrated in FIG. 5 which shows as example the trace F1 of the laser beam F (with i, the number of round trips). For each forward and return path (tai-tri), the laser beam F encounters all of the optical fibers, namely 11 optical fibers in the example illustrated in FIGS. 4 and 5.

It should be noted that each optical fiber 1 is provided with point-like alterations 4 made successively by the forward and return paths of the laser beam (ta1-tr1-ta2-tr2- . . . tai-tri). Given the transverse displacement of the laser beam F relative to the series of optical fibers 1, it should be noted that the distance between two consecutive point-like alterations 4 due to the forward and return paths of the laser beam is different from one optical fiber to the other. For example, the distance between the two consecutive point-like alterations 4 due for example to the paths ta1-tr1 and made on the first optical fiber encountered is greater than the distance between the two consecutive point-like alterations 4 due to the paths ta1-tr1 and made on the second optical fiber encountered.

According to an advantageous characteristic of embodiment, the laser beam F is moved along the transverse direction of displacement T with a trajectory beginning downstream of the first optical fiber 1 encountered and ending upstream of the last optical fiber encountered. In other words, the trajectory of the laser beam F is greater than the total width L as this clearly appears in FIG. 5. It should be noted that the scanning or displacement speed of the laser beam is preferably constant.

It follows that it is possible to obtain point-like alterations 4 of the same dimensions on all the optical fibers of the series, for each path of the laser beam F. The sheath 3 of each optical fiber has point-like alterations 4 of constant width arranged parallel to each other along a portion of the circumference (FIG. 3). Each point-like alteration 4 is in the form of an arc of a circle extending angularly between 50° and 70° with a substantially uniform width comprised between 200 micrometers and 300 micrometers.

Advantageously, the method consists in ensuring the translational travel of the optical fibers 1 at a variable speed in order to create on each optical fiber, point-like alterations 4 of which at least some of them have different spacing distances. FIG. 5 illustrates by way of example the trace F1 of the laser beam for a given variation in the speed of translation of the optical fibers. In the example illustrated, the speed of translation of the optical fibers 1 gradually decreases so that the first forward and return path (ta1-tr1) of the laser beam corresponds to a greater distance of displacement of the optical fibers compared to the distance of displacement during the second forward and return path (ta2-tr2) of the laser beam, and so on.

It follows that the point-like alterations 4 made on the optical fibers 1 have different spacing distances, as clearly appears in FIGS. 2, 3 and 5. Thus, for the first optical fiber encountered, the distance between the two consecutive point-like alterations 4 due to the first forward and return path (ta1-tr1) of the laser beam is less than the distance between the two point-like alterations 4 due to the second forward and return path (ta2-tr2).

The speed variation over the length of the optical fiber thus makes it possible to adjust the laser treatment and particularly the position of the point-like alterations 4 along the optical fiber. Advantageously, the speed variation over the length of the optical fiber is determined to obtain homogeneity of the light over the entire length of the optical fiber 1 or over the entire length of the light system with lateral light emission including several optical fibers 1. Such homogeneity of the light corresponds to a measurement of the luminance in different areas of the light system with lateral light emission and to a comparison between the minima and the maxima of luminance obtained. The luminance deviations are compared with a threshold to determine the homogeneous nature of the light. For example, a homogeneity greater than 50% could be considered sufficient knowing that the longer the optical fiber, the lower the homogeneity.

After the creation of the point-like alterations 4, the optical fibers 1 are cut and inserted into a translucent envelope to form the light system with lateral light emission. As explained, the light system with lateral light emission typically includes from one to fifteen optical fibers inserted into a translucent envelope. It should be noted that the optical fibers 1 can be inserted directly into the translucent envelope after their cutting or be stored temporarily before their insertion into the translucent envelope. According to another variant of embodiment, the optical fibers can be stored temporarily, before their cutting.

FIGS. 6 and 7 illustrate an exemplary embodiment of an installation 10 for implementing the optical fiber preparation method in accordance with the invention. The installation 10 includes a frame 11 designed to support various stations and in particular a station 12 for distributing optical fibers 1 intended to undergo a laser treatment operation in order to create point-like alterations 4 on the sheath 3 of the optical fibers. The distribution station 12 includes for each optical fiber 1, a reel 13 such as a drum on which an optical fiber 1 is wound. In the example illustrated, the distribution station 12 includes eleven reels 13 divided into two superimposed sets since the installation is aimed at the simultaneous treatment of a series of eleven optical fibers 1. Of course, the distribution station 12 includes as many reels 13 as there are optical fibers 1 to be prepared simultaneously.

Advantageously, the installation 10 includes a tensioning device for each of the optical fibers 1 exiting the reels 13. This tensioning device can be made in any appropriate manner, such as in the form of counterweights or elastic return systems forming part of the distribution station 12 for example.

The installation 10 also preferably includes a system for handling 15 the optical fibers coming from the reels 13 in order to position them next to each other before they enter a laser beam F emission station 16. This handling system 15 makes it possible to parallel the optical fibers 1 exiting the reels by advantageously positioning them all in an extension, for example horizontal, plane. This handling system 15 includes in particular rollers supported by the frame 11 and positioned to bring the optical fibers 1 to extend parallel to each other to occupy together a total width L less than the initial width occupied at the level of the distribution station 12. As clearly seen from FIGS. 6 and 7, the handling system 15 positions the optical fibers 1 parallel to each other, upstream of the laser beam emission station 16, supported by the frame 11.

The installation 10 also includes a system 17 ensuring the translation along the direction of translation A, of each optical fiber 1 to ensure their travel in front of the laser beam emission station 16. Advantageously, the system 17 ensures the simultaneous translation, along the direction of translation A, of all the optical fibers 1 to ensure their travel in front of the laser beam emission station 16, by being disposed next to each other. In the example illustrated, the translation system 17 includes two pairs of superposed rollers 18, 19 between which the optical fibers 1 are driven by friction. Each roller 18, 19 is rotatably mounted about a horizontal axis and is provided with a driving surface, for example smooth surface made of polyurethane, in contact with the series of the optical fibers 1 disposed side by side. Of course, the width of the rollers 18, 19 is adapted to receive the series of optical fibers disposed next to each other. For example, the upper roller 18 of each pair is mounted on a movable carriage 20 that can be moved by an actuator 21 to ensure the displacement of the upper rollers 18 relative to the lower rollers 19. The actuator 21 thus makes it possible to control the pressure of the rollers 18, 19 on the optical fibers 1.

For example, the lower rollers 19 are driven in rotation by an electric motor ensuring the driving in simultaneous translation of all the optical fibers 1. Advantageously, the electric motor is piloted by a control device allowing a variable speed rotation ensuring the translation of the optical fibers 1 with a variable speed.

The station for emitting 16 a laser beam F is suitable for providing a laser beam able to be moved along a direction of displacement T transverse to the direction of translation A of the optical fibers in order to create point-like alterations 4 in the sheath 3 of the optical fibers. Of course, the power of the laser beam F is adapted to create destructions or surface modifications of the sheath to expose the core of the optical fiber and obtain the point-like alterations 4. Advantageously, the emission station 16 includes a $CO_2$ laser with an emission head of a laser beam F with a constant power.

The laser beam emission head of the emission station 16 is movable along one direction. Preferably, the direction of displacement T of the laser beam F is perpendicular to the direction of translation A of the optical fibers 1. Conventionally, the emission station 16 includes a unit for piloting the laser beam which, combined with the translation system 17 control device, allow making the point-like alterations 4 on the optical fibers according to a determined variable spacing.

According to an advantageous characteristic of embodiment, the installation 10 also includes a system 23 for guiding the optical fibers 1 making it possible to guide the optical fibers in translation parallel to each other. Thus, this guide system 23 ensures the control of the center distance or of the spacing pitch between the optical fibers 1. This guide system 23 also makes it possible to control the focal distance, that is to say the distance between the optical fibers 1 and the laser beam emission head. This guide system 23 includes for example two pairs of superimposed guide rollers 24 between which the optical fibers 1 are guided. As shown in the detail of FIG. 7, the two guide rollers 24 of each pair are offset along the direction of translation A. More specifically, the upper guide rollers 24 are, relative to the lower guide rollers 24, offset in the opposite way towards the outside of the guide system. Each guide roller 24 is movably mounted about a horizontal axis of rotation and is provided with a series of juxtaposed grooves 25 each receiving in part an optical fiber 1. Advantageously, the direction of displacement T of the laser beam F is located between the two pairs of superposed guide rollers 24.

At the output of the laser beam emission station 16, the installation 10 includes a station 27 for cutting the optical fibers provided with the point-like alterations 4. For example, this cutting station 27 handles each optical fiber 1 by cutting it to the desired length for making the light system with lateral light emission. This cutting is made manually or in an automated manner.

In the example illustrated, the installation 10 includes, upstream of the cutting station 27, a station 29 for temporarily storing the optical fibers 1. This temporary storage station 29 ensures for example the vertical storage of the optical fibers thanks to return rollers 30 disposed on vertical bars 31.

The installation 10 offers the advantage of being of simple design while allowing the preparation of optical fibers with lateral light emission. This installation 10 is suitable for obtaining homogeneity of the light over the entire length of the optical fibers and this, for very long optical fibers which can reach, for example, a length of 4 m.

The invention claimed is:

1. A method for preparing optical fibers each composed of a core surrounded by a sheath, in order to create optical fibers with lateral light emission, the method comprising:
   ensuring translational travel for at least one optical fiber in front of a station for emitting a laser beam, and
   directing a laser beam towards the optical fibers in order to create point-like alterations in the sheath of the optical fibers is moved alternately along a first way of a direction transverse to the direction of translation of the optical fibers, and along a second way of the transverse direction, opposite to the first way, to obtain a distance between two consecutive point-like alterations, due to forward and return paths of the laser beam being different from one optical fiber to another optical fiber.

2. The method according to claim 1, wherein the translational travel is ensured for a series of optical fibers disposed next to each other, in front of a station for emitting a laser beam.

3. The method according to claim 1, wherein the laser beam is moved along the transverse direction with a trajectory beginning downstream of the first optical fiber encountered and ending upstream of the last optical fiber encountered.

4. The method according to claim 1, wherein a tensioning of the optical fibers is ensured during their translational travel in front of the laser beam emission station.

5. The method according to claim 1, wherein the translational travel of the optical fibers is ensured at a variable speed in order to create on each optical fiber point-like alterations, at least some of which have different spacing distances.

6. The method according to claim 5, wherein the translational travel of the optical fibers is ensured at a variable speed in order to obtain homogeneity of the light over the entire length of a light system with lateral light emission including one or more optical fibers.

7. The method according to claim 1, wherein the laser beam has a constant power.

8. The method according to claim 1, wherein after the creation of the point-like alterations, the optical fibers are cut and inserted into a translucent envelope to form a light system with lateral light emission.

9. The method according to claim 1, wherein before their cutting, the optical fibers are stored temporarily.

10. An optical fiber with lateral light emission obtained by the method in accordance with claim 1, including a sheath having point-like alterations of constant width arranged parallel to each other along a portion of the circumference.

11. An installation for preparing optical fibers each composed of a core surrounded by a sheath, with a view to forming a light system with lateral light emission for the implementation of the optical fiber preparation method according to claim 1, the installation including:
   a distribution station including for each optical fiber, a reel of an optical fiber,
   a system ensuring the translation of the optical fibers coming from the reels to ensure their travel in front of a station for emitting a laser beam,
   a station for emitting a laser beam moved alternately along both ways of a direction transverse to the direction of translation of the optical fibers in order to create point-like alterations in the sheath of the optical fibers.

12. The installation according to claim 11, wherein it includes a system for handling the optical fibers coming from the reels in order to position them parallel next to each other.

13. The installation according to claim 11, wherein the system ensures that the translation of the optical fibers has a variable speed.

14. The installation according to claim 11, comprising a system for guiding the optical fibers making it possible to control the center distance between the optical fibers.

15. The installation according to claim 11, comprising a station for cutting the optical fibers.

16. The installation according to claim 11, comprising a device for tensioning each of the optical fibers.

\* \* \* \* \*